UNITED STATES PATENT OFFICE.

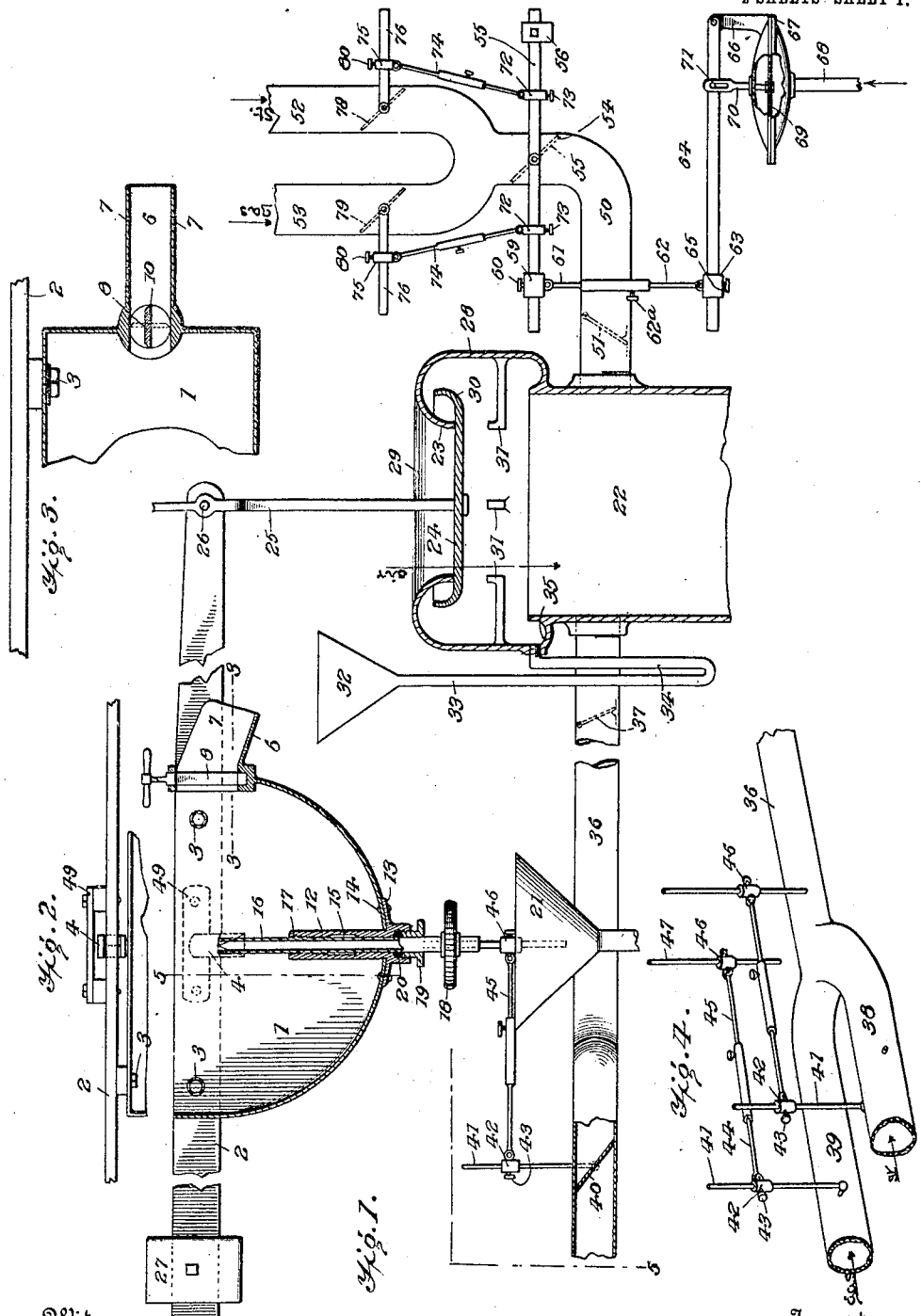

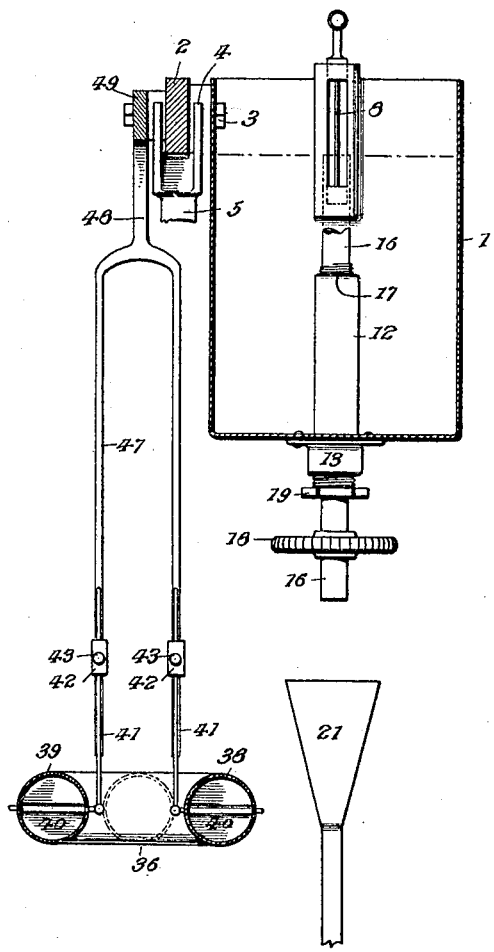

PETER G. SCHMIDT, OF TUMWATER, WASHINGTON.

REGULATOR FOR PRODUCERS.

No. 909,949.　　　　Specification of Letters Patent.　　　Patented Jan. 19, 1909.

Application filed March 5, 1908. Serial No. 419,288.

*To all whom it may concern:*

Be it known that I, PETER G. SCHMIDT, a citizen of the United States, and a resident of Tumwater, in the county of Thurston and State of Washington, have invented certain new and useful Improvements in Regulators for Producers, of which the following is a specification.

My invention is an improvement in regulators for producers and consists in certain novel constructions and combinations of parts hereinafter described and claimed.

The regulator is especially adapted for use in gas producers, and is designed to automatically regulate the admission of air, water, steam and inert gas to the producer, and to properly proportion the mixture.

Referring to the drawings forming a part hereof Figure 1 is a side view of the improvement partly in section. Fig. 2 is a partial plan view of the water cup. Fig. 3 is a section on the line 3—3 of Fig. 1. Fig. 4 is a perspective view of a portion of Fig. 1, and Fig. 5 is a section on the line 5—5 of Fig. 1.

In the present embodiment of my invention, the water cup 1 is connected to a balanced lever 2, by means of bolts or rivets 3, the lever being balanced in the fork 4, of a suitable bracket 5. The water cup 1 is provided with a spout, having an inclined bottom 6, and parallel side walls 7, and the top and bottom of the spout at the junction of the cup therewith are provided with recesses for receiving the trunnions of a gate 8, mounted to swing between the walls 7 to close the opening between the water cup and the spout. The edges 10 of one side of the gate 8 are beveled in opposite directions, as shown in Fig. 3, and the trunnions of the gate are arranged on the unbeveled side, so that the axis upon which the gate swings is in the plane of such side. This arrangement prevents impurities from choking the gate the beveled edges acting to keep the walls 7 clear at the point where the edges contact therewith.

The bottom of the water cup is provided with a central opening, and a tube 12 extends through the opening, the tube being provided with a flange 13 connected by rivets 14 with the container. The upper end of the tube is internally threaded for some distance and is annularly recessed below the threaded portion as at 15, and an over-flow pipe 16 is provided with a threaded portion 17, for engaging the thread of the tube 12, the drip pipe being provided outside of the cup with a hand wheel 18, whereby to rotate said pipe to raise it and lower it in the water cup. The outer end of the tube 12 is provided with a packing nut 19, between which and the tube is a packing 20.

It will be noticed that the upper end of the drip tube, is at the horizontal center of the water cup, for which reason the opening of the tube will always be at the center of oscillation of the water in whatever position the water cup may be. A funnel 21 is arranged below the drip pipe, into which the drip pipe delivers.

A casing 22 is provided, one end of which communicates with the producer, and the other end is provided with a velve seat 23, normally closed by a valve 24, whose stem 25 is pivoted at 26 to one end of the lever 2, the opposite end being provided with a weight 27 adjustable thereon. The valve seat 23 is formed by a flange on the end of the casing, the said flange curved outwardly and upwardly as at 28, and inwardly and downwardly as at 29, the valve also being provided with a flange 30 passing outside of the inwardly curved portion 29 of the flange when the valve is closed. Stops 31 are arranged below the valve for limiting the opening motion thereof, and a funnel 32 is arranged directly below the outlet end of the spout of the water cup, the said funnel being provided with a down pipe 33, and an up pipe 34, which leads into an annular depression formed by the flange of the casing as it bends outwardly from the casing.

A pipe 36 leads from one side of the casing, the said pipe being provided with a check valve 37 opening toward the casing, and the pipe divides into branches 38, 39, beyond the funnel 21 before mentioned. A valve 40 is pivotally mounted in each of the branches 38, 39, and the stem 41 of each of the valves is encircled by a sleeve 42, provided with a set screw 43, whereby it may be adjusted on the stem. To each sleeve is pivoted the inner member 44 of a telescoping link, the outer member 45 of the link being pivoted to a sleeve 46, adjustable on an arm 47, of a yoke 48, whose body portion is connected with the lever 2 before described as at 49. It will be evident that when the lever 2 is rocked the yoke 48 will be moved to operate the valves and by means of the adjustable sleeve and the telescoping links, this movement may be adjusted to secure a very slight movement of the valves, or a considerable movement as may be desired. The valves may be adjusted to open to different extents whereby to admit a greater amount of fluid through one pipe than the other if desired.

To the pipe 38, is connected a suitable source of steam supply, and to the pipe 39 is connected a suitable source of inert gas, such as for instance, the exhaust from a gas engine, and the extent of opening of the valves in the pipes 38, 39 may be so adjusted as to admit a suitable mixture of steam and inert gas to the casing 22 under circumstances to be presently described. A pipe 50 leads from the casing on the opposite side from the pipe 36, the pipe being provided with a check valve 51 opening toward the casing 22 and divided beyond the valve into branches 52, 53, the branch 52 being connected to a source of steam supply, and the branch 53 to a source of inert gas. A valve 54 is arranged in the pipe 50, the stem of the valve being rigid with a lever 55, provided at one end with an adjustable weight 56, and at the other end with a sleeve 59 adjustable on the lever and secured in place by a set screw 60. The outer member 61 of an extensible link is pivoted to the sleeve 59, and the inner member 62 is pivoted to another sleeve 63, adjustable on the lever 64, of a thermostat control, the sleeve being retained in its adjusted position by a set screw 65. A set crew 62$^a$ retains the members of the extensible link in their adjustable position. The opposite end of the lever 64 is pivoted to a bracket 66 connected with a casing 67 communicating by a pipe 68, with a suitable container (not shown) adapted to be arranged within the producer at the point where the temperature is to be controlled. The casing 67 is provided with a diaphragm 69 to which is connected a link 70 having a lost motion connection as at 71 with the lever 64. A sleeve 72 is arranged on the lever 55 on each side of the valve 54, the sleeves being retained in adjusted position by set screws 73, and being pivotally connected by links 74 with sleeves 75 on the stems 76, of valves 78, and 79 arranged within the branches 52, and 53 respectively, the sleeves being secured in adjusted position by set screws 80.

When the temperature in the producer attains a certain height the diaphragm will be moved upwardly a sufficient distance to take up the lost motion between the link 70 and the lever 64, which will rock the lever 55 to open the valve 54. This rocking movement of the lever 55 will also open the valves 78, 79. By adjusting the sleeves 63 and 59 on the levers 64 and 55, respectively, the extent of movement of the diaphragm required to operate the valve 54 may be adjusted within narrow limits, and this adjustment may be assisted by contracting or extending the link connecting the sleeves 63, and 59.

In operation the suction of the producer through the casing 22 will open the air inlet valve 24 a distance depending upon the strength of the draft and also upon the position of the weight 27. The swinging movement of the lever 2, will swing the yoke 48, and through the connection of the yoke with the valves 40 in the branches 38 and 39, such valves will also be opened to admit a proportionate quantity of inert gas and steam, the connections between the valves and the yoke being adjusted to properly proportion the quantities of each admitted. The rocking of the lever 2 will tilt the water cup, so that a definite quantity of water will pass through the spout into the funnel 32 and from thence into the casing 22, it being understood that a continuous supply of water is being delivered to the water cup in any suitable manner, the overflow pipe being adjusted therein to retain the level of the water constant in the said water cup.

Until the temperature in the producer has attained a predetermined height, the thermostat will exercise no action on the regulator. When, however, this height is attained, the thermostat control will come into action, opening the valve 54 and the valves 78 and 79 to admit a predetermined amount of inert gas and steam to combine with the air admitted by the valve 24. The amount of gas and steam admitted by the valves 54, 78 and 79, will depend upon the temperature in the producer, the object being to maintain the temperature approximately constant at a predetermined point. When the thermostat control comes into operation, it coöperates with the mechanism shown at the left of Fig. 1, and before such control comes into operation the mechanism shown at the left of Fig. 1 will regulate the proper mixture of the gas and water or steam to the producer. It is necessary to have such a double control for close regulation of the condition of the fire in the producer as it is obvious that proportioning the quantity of water, steam or inert gas to the quantity of air taken in will not be correct and will not maintain the same conditions in the producer nor produce an unvarying quality of gas, when the moisture content and composition of the fuel varies thereby effecting the temperature of the fire all of which however, is avoided by using this thermostatic control as an adjunct to the quantity proportioning apparatus which latter, however, is necessary to regulate conditions by proportioning the mixture when starting up in order to produce an approximately proper gas as soon as possible and before the heat of the fire has reached the thermostat bulb in the fire. This is necessary as no thermostat bulbs have yet been devised which can be placed in the decomposition zone on account of the great heat and it is only possible to insert them in such a part of the producer which does not become so greatly heated but which will be maintained at a proportionate temperature as the zone whose temperature is to be controlled.

It will be understood, that the amount of steam and inert gas, and of water admitted is regulated in accordance with the amount of air admitted, and this is true whether the admission of the different substances is controlled by the thermostatic control or by the strength of the draft. When the draft through the producer is increased the amount of air admitted is necessarily greater, and the temperature would rise accordingly, but since there is a greater admixture of steam and inert gas admitted, the combustion is controlled and the temperature held constant. The thermostatic control supplements the action of the balanced lever control. With the latter, the ratio of the mixture of steam and inert gas to the air is constant after adjustment, while the former varies the ratio of the mixture to the air in accordance with the temperature in the producer. When the thermostat admits more or less mixture of steam and inert gas it naturally decreases the draft through valve 24 and automatically admits less air. The same holds true of the relation between the admission of mixture by valves 40 and draft through valve 24.

I claim:—

1. A producer regulator comprising a casing through which the gaseous fluids to the producer pass, said casing having an opening, a valve for closing the opening, a balanced lever, a stem connecting the valve with one end of the lever, an adjustable weight on the other end, a water cup rigidly connected with the lever, the axis of oscillation of the lever passing through the center of the cup, said cup having a spout with parallel side walls, a gate having parallel edges for closing the spout, a funnel to which the spout delivers, said funnel delivering to the casing, a pipe leading from the side of the casing and dividing into branches, one adapted for connection with a source of steam supply and the other with a source of inert gas, a check valve in the pipe, opening toward the casing, a valve in each of the branches, a yoke having its body portion rigidly connected with the lever, an adjustable connection between the arms of the yoke and the valves whereby the oscillation of the lever will oscillate the valves, an over-flow conduit in the cup at the center thereof, and means for adjusting said conduit vertically in the cup, a second conduit leading from the casing and dividing into branches, one adapted for connection with a source of steam supply, and the other with a source of inert gas, a check valve in said conduit, opening toward the casing, a valve beyond the check valve, a valve in each of the branches, a casing adapted for connection with a thermostat, a diaphragm in the casing, a lever pivoted on the casing, a lever rigid with the valve in the second pipe, an adjustable connection between the ends of the lever, and the valves in the branches, whereby the movement of the diaphragm will operate said valves for the purpose set forth and an adjustable connection between the lever on the casing and the lever rigid with the valve in the second pipe.

2. A producer regulator comprising a casing through which the gaseous fluids to the producer pass, said casing having an opening, a valve for closing the opening, a balanced lever, a stem connecting the valve with one end of the lever, an adjustable weight on the other end, a water cup rigidly connected with the lever, the axis of oscillation of the lever passing through the center of the cup, said cup having a spout, a funnel to which the spout delivers, said funnel delivering to the casing, a conduit leading from the side of the casing and dividing into branches, one adapted for connection with a source of steam supply and the other with a source of inert gas, a check valve in the conduit, opening toward the casing, a valve in each of the branches, a yoke having its body portion rigidly connected with the lever, an adjustable connection between the arms of the yoke and the valves, whereby the oscillation of the lever will oscillate the valves, an over-flow pipe in the cup at the center thereof, and means for adjusting said pipe vertically in the cup.

3. A producer regulator comprising a casing through which the gaseous fluids to the producer pass, said casing having an opening, a valve for closing the opening, a balanced lever, a stem connecting the valve with one end of the lever, an adjustable weight on the other end, a water cup rigidly connected with the lever, the axis of oscillation of the lever passing through the center of the cup, said cup having a spout with parallel side walls, a gate for closing the spout, a funnel to which the spout delivers, said funnel delivering to the casing, a conduit leading from the side of the casing and dividing into branches, one of the branches being adapted for connection with a source of steam supply and the other with a source of inert gas, a check valve in the pipe opening toward the casing, a valve beyond the check valve, a valve in each of the branches, a casing for connection with a thermostat, a diaphragm in the casing, a lever pivoted on the casing, a lever rigid with the valve in the pipe, an adjustable connection between the ends of the lever, and the valves in the branch pipe, and a connection between the levers whereby the diaphragm will operate said valves in unison.

4. A producer regulator comprising a casing through which the gaseous fluids to the producer pass, said casing having an opening, a valve for closing the opening, a balanced lever, a connection between one end of the lever and the valve, an adjustable weight on the other end of the lever, a water cup secured to the lever and having a spout delivering to the casing, the axis of oscillation of the lever passing through the cup, an over-flow pipe arranged at the center of the cup and adjustable vertically therein, a conduit leading from the casing and dividing into branches, a valve in each of the branches, one of said branches being adapted for connection with a source of steam supply, and the other with a source of inert gas supply, an adjustable connection between each of said valves and the lever, whereby the oscillation of the lever will operate the valves, and means controlled by the temperature in the producer for varying the relative quantities of steam and inert gas, and of air.

5. A producer regulator comprising a casing through which the gaseous fluids to the producer pass, said casing having an opening, a valve for closing the opening, a balanced lever, a connection between one end of the lever and the valve, an adjustable weight on the other end of the lever, a water cup secured to the lever and having a spout delivering to the casing, the axis of oscillation of the lever passing through the center of cup, an over-flow pipe arranged at the center of the cup and adjustable vertically therein, a conduit leading from the casing and dividing into branches, a valve in each of the branches, one of said branches being adapted for connection with a source of steam supply, and the other with a source of inert gas supply, and an adjustable connection between each of said valves and the lever, whereby the oscillation of the lever will operate the valves.

6. A producer regulator comprising a casing through which the gaseous fluids to the producer pass, an inlet valve in connection with the casing, a balanced lever connected with the valve and normally retaining it in closed position, a conduit leading from the casing and divided into branches, one of the branches being adapted for connection with a source of steam supply, and the other with a source of inert gas, valves for controlling the branches, and an adjustable connection between said valves and the lever, a water cup connected with the lever, and oscillating therewith, said cup being provided with a spout and means for conducting the water from the spout into the casing.

7. A producer regulator comprising a casing through which the gaseous fluids to the producer pass, an inlet valve in connection with the casing, a balanced lever connected with the valve, and normally retaining it in closed position, a water cup having a rigid connection with the lever and delivering to the casing, a conduit leading from the casing and dividing into branches, one of said branches being adapted for connection with a source of steam supply, and the other with a source of inert gas, valves normally closing said pipes, and an adjustable connection between the valves and the lever, whereby the opening of the inlet valve will open said last named valves.

8. A producer regulator comprising a casing through which the gaseous fluids to the producer pass, an air inlet valve in connection with the casing, a balanced lever connected with the valve and normally retaining it in closed position, a pipe leading from the casing and dividing into branches, one of the branches being adapted for connection with a source of steam supply, and the other with a source of inert gas, valves for controlling the branches, and an adjustable connection between said valves and the lever for the purpose set forth.

9. A producer regulator comprising a casing through which the gaseous fluids to the producer pass, an air inlet valve in connection with the casing, a balanced lever connected with the valve and normally retaining it in closed position, a conduit leading from the casing and dividing into branches, one of the branches being adapted for connection with a source of steam supply, and the other with a source of inert gas, valves for controlling the branches, and means controlled by the temperature in the producer for varying the relative quantities of air and of steam and inert gas admitted to the producer.

10. A producer regulator comprising a casing through which the gaseous fluids to the producer pass, said casing being provided with a balanced normally closed air inlet valve, a conduit leading from the casing and dividing into branches, one of the branches being adapted for connection with a source of steam supply, and the other with a source of inert gas supply, valves normally closing the branches, means for delivering water to the casing, and means whereby the opening of the inlet valve will open the valves in the branches and will increase the water supply to the casing.

11. A producer regulator comprising a casing through which the draft of the producer passes, said casing being provided with a balanced normally closed air inlet valve, a conduit leading from the casing and dividing into branches, one of the branches being adapted for connection with a source of steam supply, and the other with a source of inert gas supply, valves normally closing the branches, means for delivering water to the casing, and means controlled by the temperature in the producer for varying the relative quantity of air, and of steam and inert gas admitted.

12. A producer regulator comprising a casing through which the draft of the producer passes, said casing being provided with an air inlet valve, means for admitting steam and inert gas to the casing, means for supplying water to the casing, and a connection between the inlet valve, the steam and inert gas supply and the water supply, whereby the operation of the inlet valve will control the admission of the steam and inert gases and the water supply for the purpose set forth.

13. In a producer regulator, a steam supply, an inert gas supply, means for controlling each of said supplies, an air supply, a balanced lever controlled by the air supply and an adjustable connection between the lever and the controlling means for the steam supply and the inert gas supply, whereby the operation of the air supply controlled means will operate the controlling means for the steam and inert gas supply.

14. In a producer regulator, a steam supply, an inert gas supply, means for controlling each of said supplies, an air supply, a balanced lever for controlling the air supply and means controlled by the temperature in the producer for varying the relative quantity of the air and of the steam and inert gas.

15. In a producer regulator, means for supplying water to the producer, means for supplying steam and inert gas to the producer, means for supplying air to the producer, means for varying the ratio of the steam and inert gas to the air and to each other, and means whereby the draft will proportion the air supply and the steam and inert gas supply.

16. A producer regulator comprising a casing through which the gaseous fluids to the producer pass, said casing being provided with a balanced normally closed air inlet valve, a conduit leading from the casing and dividing into branches, one of the branches being adapted for connection with a source of steam supply, and the other with a source of inert gas supply, valves normally closing the branches, means for delivering water to the casing, and means controlled by the temperature in the producer for varying the relative quantity of air, and of steam and inert gas admitted, and the water supply.

17. A producer regulator comprising means for admitting air to the producer, means for supplying a mixture of steam and inert gas to the air admitted, and means for regulating the amount of steam and inert gas admitted in accordance with the amount of air admitted.

18. A producer regulator comprising a casing through which the draft of the producer passes, said casing being provided with a balanced normally closed air inlet valve, a pipe leading from the casing and dividing into branches, one of the branches being adapted for connection with a source of steam supply, and the other with a source of inert gas supply, valves normally closing the branches, means for delivering water to the casing, and means for varying the ratio of the steam to the inert gas.

PETER G. SCHMIDT.

Witnesses:
D. H. MEANY,
CHARLES PLATNER.